US009596095B2

(12) United States Patent
Redmond (10) Patent No.: US 9,596,095 B2
(45) Date of Patent: Mar. 14, 2017

(54) OPTIMIZED NEAR-SIMULTANEOUS DISTRIBUTION OF MULTIMEDIA CONTENT

(75) Inventor: Stefan Paul Redmond, Pointe Claire (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 1005 days.

(21) Appl. No.: 13/194,392

(22) Filed: Jul. 29, 2011

(65) Prior Publication Data

US 2013/0031210 A1   Jan. 31, 2013

(51) Int. Cl.
| | | |
|---|---|---|
| G06F 15/16 | (2006.01) | |
| H04L 12/18 | (2006.01) | |
| H04N 21/2668 | (2011.01) | |
| H04L 29/06 | (2006.01) | |
| H04N 21/24 | (2011.01) | |

(Continued)

(52) U.S. Cl.
CPC ........ *H04L 12/1881* (2013.01); *H04L 12/185* (2013.01); *H04L 65/4084* (2013.01); *H04N 21/2408* (2013.01); *H04N 21/252* (2013.01); *H04N 21/2668* (2013.01); *H04N 21/6405* (2013.01); *H04N 21/6408* (2013.01); *H04N 21/64322* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 6,848,004 B1 * | 1/2005 | Chang et al. | ................. | 709/232 |
| 7,296,285 B1 * | 11/2007 | Jun et al. | ........................ | 725/46 |

(Continued)

FOREIGN PATENT DOCUMENTS

WO    2009/073372 A1    6/2009

OTHER PUBLICATIONS

Jack Y. B. Lee et al., Design, Performance Analysis, and Implementation of a Super-Scalar Video-on-Demand System, IEEE Transactions on Circuits and Systems for Video Technology, vol. 12, No. 11, Nov. 2002, pp. 983-997.

(Continued)

*Primary Examiner* — Mohamed Ibrahim
(74) *Attorney, Agent, or Firm* — Francois Cartier; Ericsson Canada Inc.

(57) ABSTRACT

The "swarming" behavior of multimedia content distribution network subscribers—numerous, near-simultaneous requests for the same content by different users—is predicted, based on analysis of past viewing habits. Users are grouped based on correlations in the multimedia content requested and the time at which it is requested. When a set of users of a group requests particular multimedia content, that content is autonomously distributed, via a shared distribution channel, to the terminal equipment of all users in the group, where it is buffered. As other users in the group request the same multimedia content, an initial portion is distributed to each requesting user via an individual channel. As the rendered content catches up to the buffered content, the terminal equipment switches from the content delivered via the individual distribution channel to the buffered content. The individual distribution is then terminated, and the individual distribution channel released.

20 Claims, 7 Drawing Sheets

(51) Int. Cl.
    *H04N 21/25*     (2011.01)
    *H04N 21/6405*     (2011.01)
    *H04N 21/6408*     (2011.01)
    *H04N 21/643*     (2011.01)

(56) References Cited

U.S. PATENT DOCUMENTS

| | | | |
|---|---|---|---|
| 7,480,703 B2 * | 1/2009 | Shapiro | 709/220 |
| 2007/0005771 A1 | 1/2007 | Collet et al. | |
| 2009/0193485 A1 * | 7/2009 | Rieger et al. | 725/114 |
| 2010/0121955 A1 | 5/2010 | Doganaksoy et al. | |
| 2010/0287586 A1 * | 11/2010 | Walter et al. | 725/34 |
| 2011/0264530 A1 * | 10/2011 | Santangelo et al. | 705/14.64 |
| 2012/0005333 A1 * | 1/2012 | Beattie et al. | 709/224 |

OTHER PUBLICATIONS

PCT Search Report from corresponding application PCT/IB2012/055083.

\* cited by examiner

OPTIMIZED NEAR-SIMULTANEOUS DISTRIBUTION OF MULTIMEDIA CONTENT

FIELD OF INVENTION

The present invention relates generally to the distribution of multimedia content via a network, and in particular to a system and method for optimization of the distribution of multimedia content to a plurality of correlated users near-simultaneously.

BACKGROUND

Internet Protocol TeleVision (IPTV) is a multimedia content delivery system in which multimedia content is delivered from servers to terminal equipment using the architecture and networking methods of the Internet Protocol (IP) suite over a packet-switched network infrastructure, such as the Internet and broadband Internet access networks. As used herein, terminal equipment includes the equipment necessary to render the multimedia content to users, such as a TV display screen, as well as any equipment necessary to receive the multimedia content from the network, such as a set top box (STB). IPTV systems supplement and sometimes are deployed alongside, or integrated with, traditional multimedia content delivery systems, such as radio frequency broadcast, satellite broadcast, or cable television (CATV) distribution. In general, all such systems are referred to herein as multimedia content distribution networks.

One known and increasingly popular service offered to subscribers of multimedia content distribution networks is the ad hoc distribution of multimedia content to individual users, on specific request. In some aspects, such as where the multimedia content comprises conventional movies, this service is known as Video on Demand (VoD). However, in general, the ad hoc distribution of multimedia content on request extends beyond movies, and includes multimedia content such as short video clips (e.g., YouTube® videos), non-real-time IPTV video streams, audio content (e.g., music, podcasts), and the like.

Providing the instantaneous, ad hoc distribution of multimedia content on request to user can place large demands on the multimedia content distribution network. Such demand is largely user driven and can therefore be hard to predict. Thus the load on a multimedia content distribution network can vary drastically, leading to poor utilization of network resources and possibly negative user experience of the distribution service if the network becomes overloaded.

One user phenomenon, which has become more prevalent in the age of increasing social connectivity, is user "swarming" behavior, wherein a large number of users request the same content within a short time period. For example, users may recommend certain multimedia content, or even simply announce that they have requested or are viewing it, via social network resources (e.g., Twitter®, Facebook®), or by conventional communication channels such as wireless or conventional telephone, Short Message Service (SMS, also known simply as "texting"), Instant Messaging (IM), email, and the like. Due to such a recommendation/announcement, which itself may spread "virally" among a large number of users, other subscribers to the multimedia content distribution network may request the same multimedia content, at roughly the same time. This results in a large number of individual streams (e.g., IPTV unicast streams), placing a high instantaneous load on the network, and resulting in the inefficient, duplicative distribution of the same content along numerous separate channels, very closely aligned in time (i.e., near-simultaneously).

SUMMARY

According to one or more embodiments disclosed in the claimed herein, the "swarming" behavior of multimedia content distribution network subscribers is predicted, based on analysis of past viewing habits. In particular, user groups are formed based on correlations among users requesting the same multimedia content at approximately the same time (i.e., within a predetermined temporal duration)—referred to herein as a "swarm." When a set of users of a group requests particular multimedia content, that content is autonomously distributed, via a shared distribution channel, to the terminal equipment of all users in the group, where it is buffered. As other users in the group request the same multimedia content, the initial portion is distributed to each requesting user via an individual channel (e.g., a unicast stream). As the rendered content catches up to the buffered content, the terminal equipment seamlessly switches from the content delivered via the individual distribution channel to the buffered content. The individual distribution is then terminated, and the individual distribution channel released. In this manner, only an initial portion of the multimedia content is required to be individually distributed to multiple users, and the bulk of the multimedia content is efficiently distributed to all users predicted to participate in the "swarm" by a broadcast channel. As one example, the broadcast channel may comprise e.g. a Quadrature Amplitude Modulated, or QAM channel, which is a common format for encoding and transmitting digital cable channels by cable television providers.

One embodiment relates to a method of optimizing the distribution of multimedia content to a plurality of users within a predetermined temporal duration, by a computing machine in a network node. Multimedia content requests of a plurality of users are monitored. Users are correlated based on the multimedia content requested and the times at which it is requested. One or more groups of users are formed based on the content and time correlations. A request for first multimedia content is received from a set of users in a first group, within a predetermined temporal duration. Requests for the first multimedia content from other users in the first group are predicted. In response to the prediction, a channel is allocated for the broadcast of the first multimedia content to users in the first group. Terminal equipment associated with users in the first group is controlled to receive and buffer the first multimedia content. The first multimedia content is broadcast on a shared streaming resource to users in the first group.

Another embodiment relates to a method of rendering multimedia content by a computing machine in terminal equipment connected to a distribution network. Multimedia content requests are submitted to the distribution network over time, such that users of different terminal equipment may be aggregated into groups of users based on correlations of multimedia content requested and the time at which it is requested. In response to a set of other users in a group requesting first multimedia content, at least part of the first multimedia content is autonomously received over a broadcast channel. The first multimedia content received over a broadcast channel is buffered. In response to user input, a request for the first multimedia content is submitted to the distribution network. An initial portion of the first multimedia content is received from the distribution network. After rendering the initial portion of the first multimedia content received from the distribution network, the buffered first multimedia content is rendered.

Yet another embodiment relates to a node in a multimedia content distribution network. The node includes a data interface to the network, and a database operative to store a plurality of multimedia content. The node also includes a computing machine. The computing machine is operative to monitor multimedia content requests received over the network, via the data interface, from a plurality of users; correlate users based on the multimedia content requested and the times at which it is requested; form one or more groups of users based on the content and time correlations; receive a request, via the data interface, for first multimedia content from a set of users in a first group within a predetermined temporal duration; predict requests for the first multimedia content from other users in the first group; in response to the prediction, allocate a channel for the broadcast of the first multimedia content to users in the first group; retrieve the first multimedia content from the database; control terminal equipment associated with users in the first group to receive and buffer the first multimedia content; and broadcast the first multimedia content over the network, via the data interface, on a shared streaming resource, to users in the first group.

Still another embodiment relates to a terminal equipment connected to a distribution network and operative to selectively render multimedia content to users. The terminal equipment includes a data interface to the network, and a user interface operative to receive user requests for multimedia content. The terminal equipment also includes a display operative to render multimedia content to users, and memory operative to buffer multimedia content. The terminal equipment further includes a computing machine. The computing machine is operative to submit multimedia content requests to the distribution network over time, via the data interface, such that users of the terminal equipment may be aggregated into groups of users based on correlations of multimedia content requested and the time at which it is requested; autonomously receive from the network via the data interface, in response to a set of other users in a group requesting first multimedia content, at least part of the first multimedia content over a broadcast channel; buffer in memory the first multimedia content received via the data interface over a broadcast channel; in response to user input at the user interface, submit a request for the first multimedia content to the distribution network via the data interface; receive from the distribution network, via the data interface, an initial portion of the first multimedia content; and after rendering the initial portion of the first multimedia content received from the distribution network via the display, rendering the buffered first multimedia content via the display.

DETAILED DESCRIPTION

Figure 1:
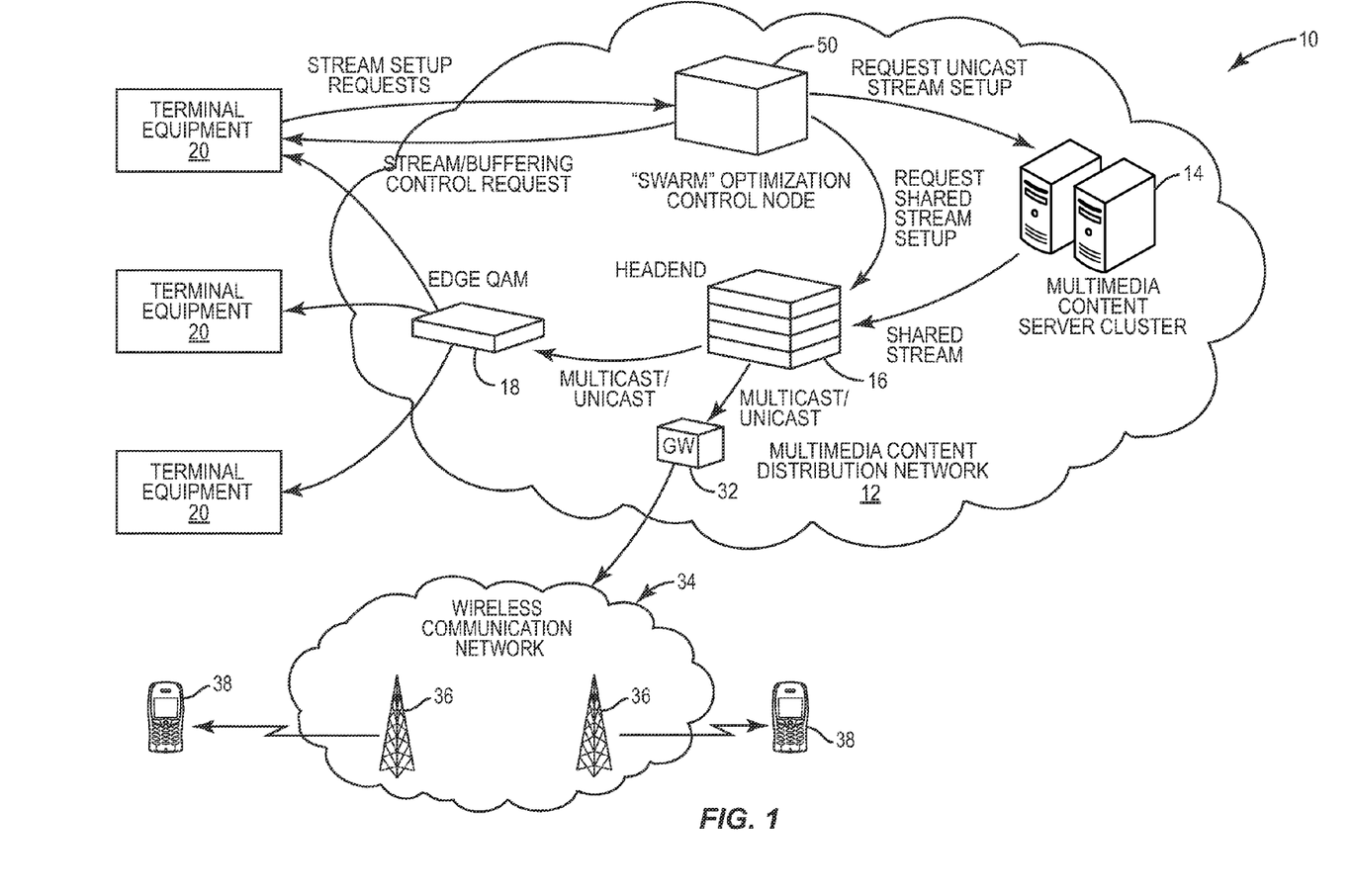
FIG. 1 is a functional block diagram of a multimedia content distribution environment.

FIG. 1 depicts a representative multimedia content distribution environment 10. The environment includes a multimedia content distribution network 12, providing multimedia content to a plurality of subscribers' terminal equipment 20. In particular, FIG. 1 depicts the elements of a multimedia content distribution network 12 involved in the ad hoc distribution of multimedia content to users, upon request. Accordingly, numerous components of the multimedia content distribution network 12 (i.e., those involved in the provision of other multimedia content distribution services, such as real-time broadcasts, pay-per-view events, and the like) are not depicted in FIG. 1 for simplicity.

The multimedia content distribution network 12 includes one or more multimedia content server clusters 14, a headend 16, an edge QAM 18, and an inventive "swarm" optimization control node 50. These elements are representative only; for example, the distribution of content to terminal equipment 50 may be by a channel other than QAM. The multimedia content server cluster 14 stores and selectively serves multimedia content, such as movies, video clips, IPTV streams, music, podcasts, and the like, in response to user requests. The headend 16 routes various streams of multimedia content, e.g., from the multimedia content server cluster 14, in individual—or "unicast"— channels, as well as in broadcast—or "multicast"—channels to users via, e.g., the edge QAM 18. The edge QAM 18 (or other distribution equipment) distributes multimedia content to users' terminal equipment 20.

In one embodiment, the headend 16 additionally directs unicast and multicast streams of multimedia content to a gateway 32, which forwards the multimedia content to a wireless communication network 34, such as the 3GPP Long Term Evolution (LTE) enhancements to the Universal Mobile Telecommunications System (UMTS). The multimedia content may then be transmitted, in either individual or broadcast channels, from base stations (e.g., eNodeB) 36, to User Equipment 38, where it is rendered for users. As used herein, terminal equipment 20 includes User Equipment 38 receiving multimedia content via a wireless communication network 34. Note that, although the wireless communication network 34 is depicted in FIG. 1 as separate from the multimedia content distribution network 12, connected by a media gateway 32, in one embodiment, the operative multimedia nodes 14, 16, 50 may be part of the wireless communication network 34. One skilled in the art will appreciate that Wireless Communication Network 34 can make use of any of a number of different communication technologies including, but not limited to, technologies based on code division multiple access (CDMA), Evolution Data Optimized (EV-DO), the global system for mobility (GSM), GSM Packet Radio Service (GPRS), high speed packet access (HSPA). The communication network 34 can also take advantage of other delivery channels including delivery of content through downstream satellite transmissions.

As users request multimedia content to be distributed to their terminal equipment 20, the "swarm" optimization control node 50 maintains a record of the content requested, and the time at which it was requested. Both of these data are correlated among a large number of users. For example, a positive correlation among users for multimedia content requested indicates the users requested the distribution of the same content. A positive correlation among users for the time at which the multimedia content was requested indicates the users requested the distribution of the same content within a predetermined duration. In one embodiment, the time-of-request correlation between two users may increase as the time difference between their requests for the same multimedia content decreases. In one embodiment, correlations between users based on stopping time of the multimedia content distribution are also collected and analyzed.

Figure 2:
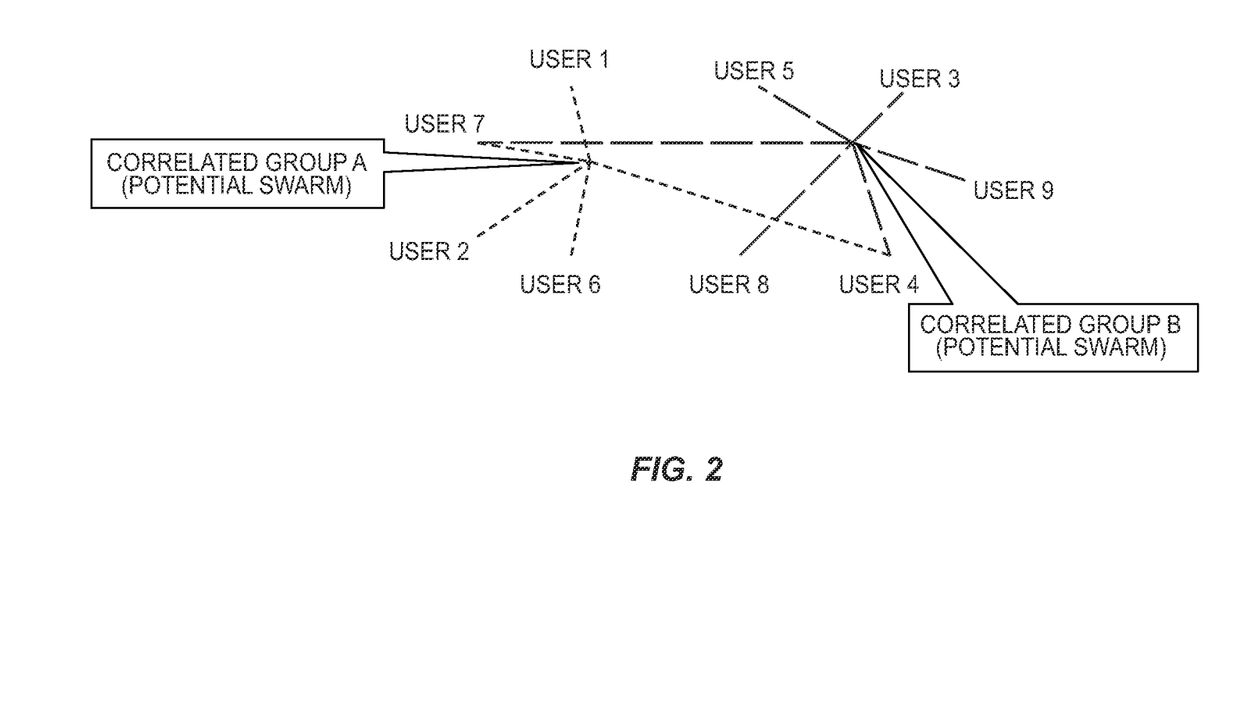
FIG. 2 is a diagram depicting the correlation of users into groups, based on multimedia content viewing history.

Users are aggregated into groups based on (at least) the multimedia content and time-of-request correlations. FIG. 2 depicts a simple, representative diagram of a plurality of users formed into two groups—denoted as Group A and Group B. A user is added to a group if its correlations to the multimedia content and time-of-request with other users in the group exceed predetermined thresholds. The correlations, and hence group memberships, are updated on an ongoing basis. In one embodiment, correlations between, e.g., two users are updated every time one of them requests the delivery of multimedia content. If the other user requests the same content within a predetermined duration, the correlation value increases (in one embodiment, it increases to a greater extent the closer in time the two requests are submitted). If the other user makes no multimedia content distribution request, or requests different multimedia content, the correlation value decreases. Group compositions are also updated on an ongoing basis. In one embodiment, group memberships are adjusted every time correlation values between users change. In another embodiment, group memberships are update periodically, reflecting changes in user correlations occurring since the last group update. As depicted in FIG. 2, group memberships may be overlapping. For example, both Users 4 and 7 are indicated as belonging to both Groups A and B. Over time, social connections between users may be implied by correlations in content requests.

Because the grouping of users as described herein is based on correlations indicating past, temporally close requests for distribution of the same multimedia content, group membership is highly predictive of future, near-simultaneous requests for distribution of the same multimedia content, also referred to herein as "swarms." That is, if one or more users of a group requests particular multimedia content, there is a high likelihood that other users of the same group will similarly request the same multimedia content, within a short time period of the first set of users' requests.

According to embodiments of the present invention, this predictability of multiple requests for the same multimedia content within a limited duration (i.e., a "swarm") is exploited to achieve efficient utilization of the multimedia content delivery network 12. In particular, the multimedia content requested by a set of users in a group is autonomously delivered to all users in the same group, utilizing a shared, or broadcast, channel. The set of users triggering the broadcast may be as small as a single user, or any number of users up to the size of the group. In one embodiment, the size of the "triggering set" of users is a predetermined number. In another embodiment, the size of the "triggering set" of users is a predetermined percentage of the total number of users in the relevant group.

Terminal equipment 20 associated with each user in the group is directed to buffer the multimedia content (e.g., in memory, or on a high-capacity storage medium, such as magnetic media disc drive). As users within the group request delivery of the same multimedia content, only an initial portion of the content needs to be delivered to each user, until that user "catches up" to the point at which the buffered multimedia content within its own terminal equipment 20 begins. The terminal equipment 20 then "switches over" from rendering the multimedia content delivered to it over an individual channel, to rendering the buffered multimedia content that was delivered in a broadcast channel. This dramatically reduces the required duration of each individual delivery channel (e.g., IPTV unicast stream) to each member of the group. If one or more group members do not request the same multimedia content within a predetermined duration of the broadcast, the buffered content may be deleted from the terminal equipment 20.

Figure 3:
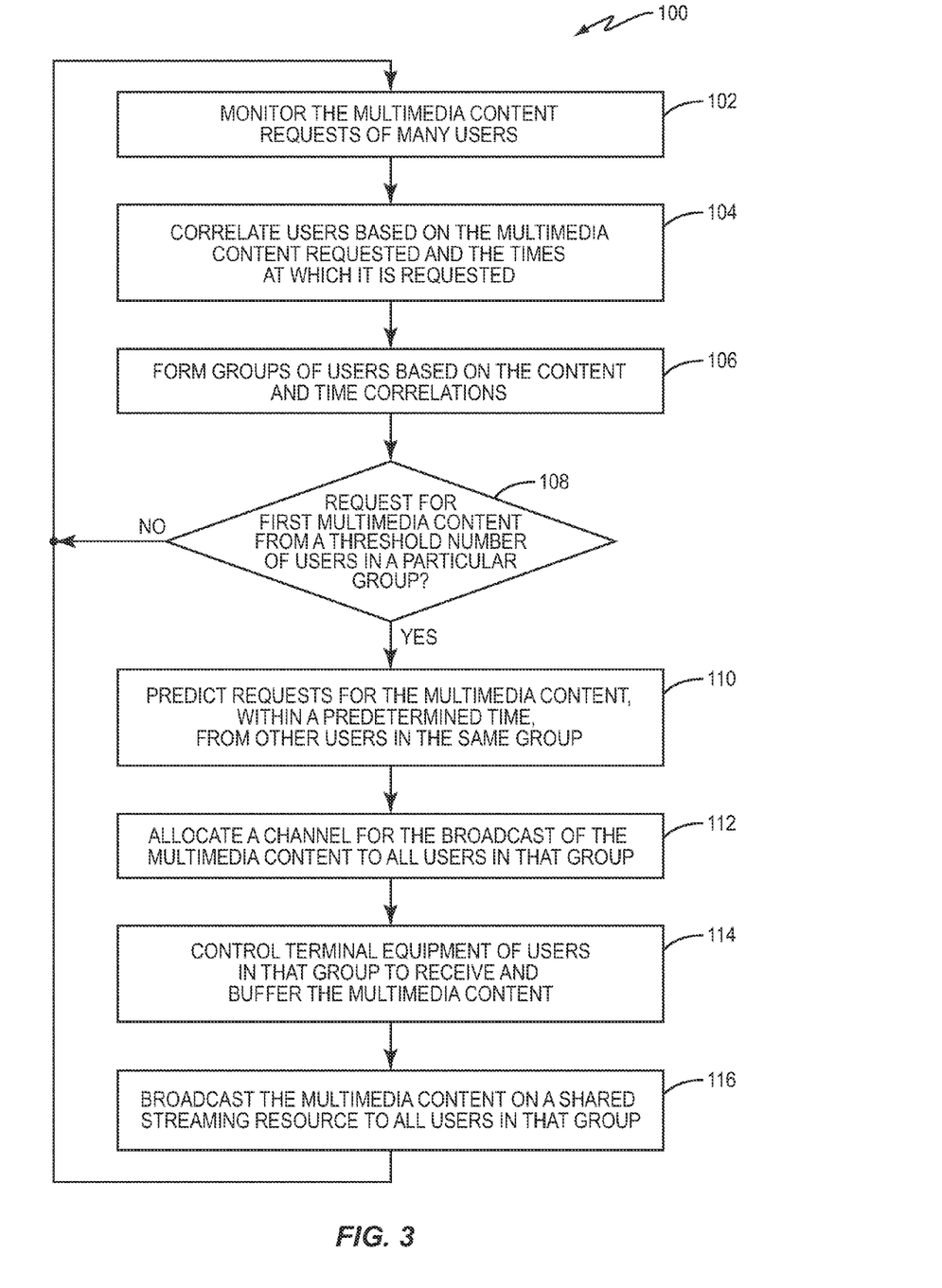
FIG. 3 is a flow diagram of a method of optimizing the distribution of multimedia content to a plurality of users.

FIG. 3 depicts a method 100 of optimizing the distribution of multimedia content to a plurality of users, the method performed by a computing machine (e.g., an appropriately configured and programmed processor operatively coupled to memory) in a "swarm" optimization control node 50. On an ongoing basis, the control node 50 monitors the multimedia content requests of a very large number of users (block 102). The control node 50 correlates users based on the multimedia content requested and the times at which it is requested (block 104). Based upon these correlations, the control node 50 forms groups of users, the users within each group likely to request the same multimedia content near-simultaneously (block 106). As indicated by the loop control flow, this process is ongoing, with both user correlations and group membership being adjusted based on users' multimedia content requests.

If the control node 50 receives a request for particular multimedia content from a user in a particular group (block 108), it predicts that requests for the same multimedia content will be received from other users in the same group, within a predetermined, short duration (i.e., near-simultaneously) (block 110). In one embodiment, the control node 50 may make such a prediction only after a predetermined number of users in the same group have requested the same multimedia content. In either case, in response to the predicted activity, the control node 50 allocates a broadcast channel for the distribution of the multimedia content to all users in the initially-requesting user's group (block 112). The broadcast channel may comprise, as one example, a QAM channel. As another example, the control node 50 may form a dedicated, transient Internet Group Management Protocol (IGMP) group for the distribution of the multimedia content. Furthermore, each wireless communication network 34 defines broadcast channels for the simultaneous distribution of data to a plurality of User Equipment 38, the details of which are not relevant to an explanation of embodiments of the present invention.

When a broadcast channel has been allocated, the control node 50 sends control directives or requests to the terminal equipment 20 associated with all users in the initially-requesting user's group, directing the terminal equipment 20 to buffer the multimedia content, and identifying the broadcast channel (block 114). The "swarm" optimization control node 50 then broadcasts the multimedia content to all users in the group (block 116), which is buffered at each terminal equipment 20.

In one embodiment, the "swarm" optimization control node 50 may additionally broadcast the same multimedia content to the terminal equipment 20 of all users in a second group—that is, a group defined through user content and time-of-request correlations that is distinct from the initially-requesting user's group. For example, this may occur if, at block 108, the detection of a "swarm" requires a plurality of users in the initial group to request the same multimedia content, and a threshold number of these users are also members of the second group. In general, multiple groups may quickly be joined in the predicted "swarm."

Returning to the discussion of a single group for simplicity, if the prediction was accurate, within a short time, the control node 50 will receive a plurality of requests, having different (small) time offsets, for the same multimedia content as that broadcast to the group. The control node 50 responds conventionally by establishing individual distribution of the multimedia content to each requesting user (e.g., in individual IPTV unicast streams). For requesting users not in the relevant group—and hence which did not buffer the broadcast multimedia content—the individual distribution of multimedia content continues until the entire content has been rendered to the requesting user. However, for users within the group—that is, those with at least some of the multimedia content buffered in their terminal equipment 20—the individual distribution of multimedia content need last only until the respective users "catch up" to the buffered content. At that point, the terminal equipment may "switch over" from rendering the multimedia content as received in the individual distribution to rendering the buffered multimedia content, as received earlier in the broadcast distribution. As known in the art, some terminal equipment 20 is able to accomplish the "switch over" in a manner nearly or totally imperceptible to a viewer watching the rendered content. Once the terminal equipment 20 has switched to rendering the buffered multimedia content, the individual distribution of content to that terminal equipment 20 may be terminated.

In most cases, the amount of multimedia content required to be distributed to each user via an individual distribution channel will be small, compared to the duration of the entire multimedia content. In one embodiment, the multimedia content is broadcast beginning at a point, referred to herein as the "broadcast commencement point," slightly ahead of an aggregate viewing point (within the multimedia content) of all users receiving and rendering the content at the time the broadcast begins. The broadcast commencement point is selected so as to minimize the combined, instantaneous network load, taking into account the size of the predicted "swarm" and time over which the swarm will develop.

Figure 4:
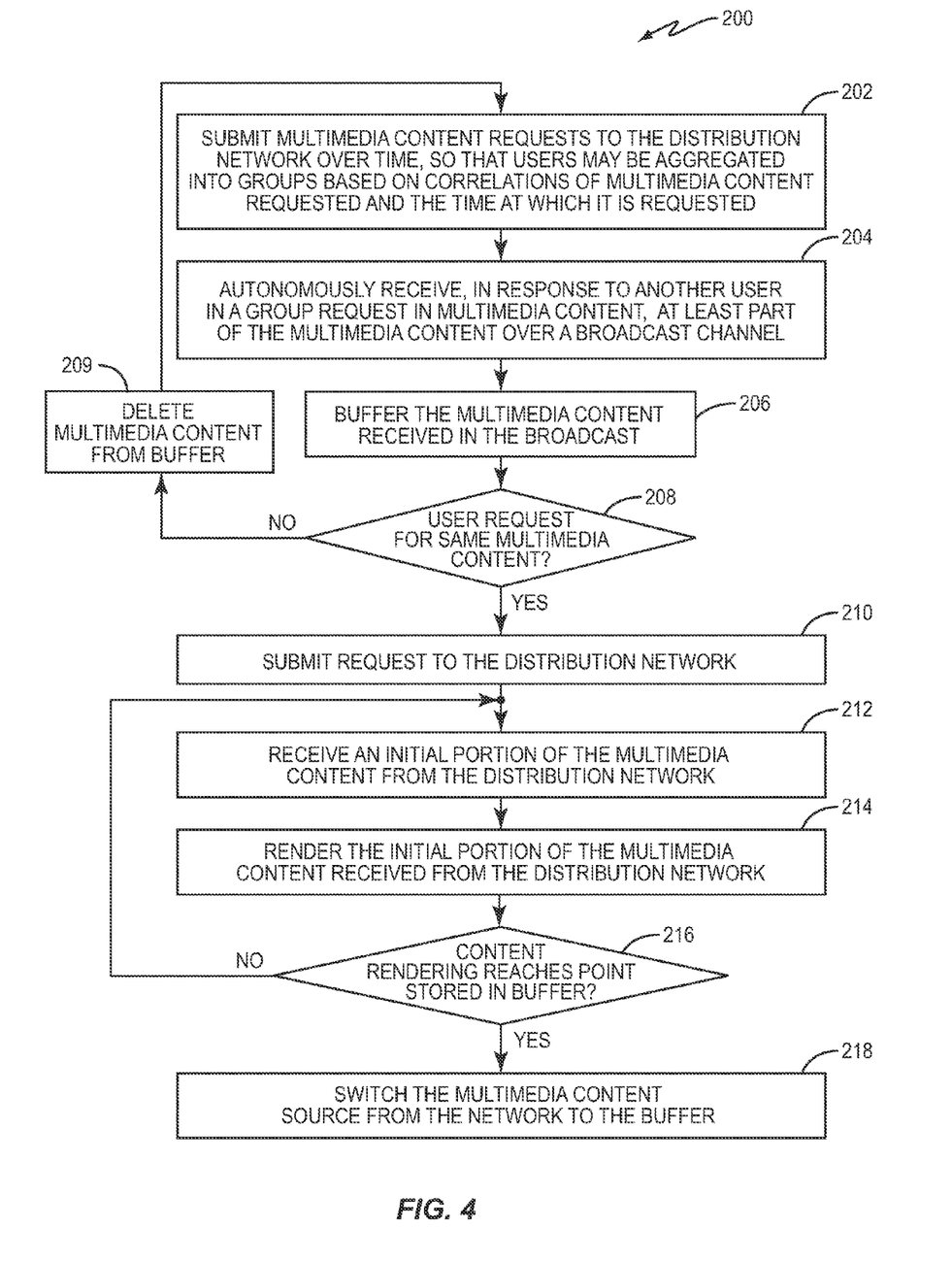
FIG. 4 is a flow diagram of a method of rendering multimedia content by terminal equipment connected to a multimedia content distribution network.

FIG. 4 depicts a method 200 of rendering multimedia content, the method performed by a computing machine (e.g., an appropriately configured and programmed processor operatively coupled to memory) in a terminal equipment 20 connected to a multimedia content distribution network 12. Over time, the terminal equipment 20, in response to user input, submits multimedia content requests to the network 12, as conventionally known. This allows an entity within the network 12 (such as a "swarm" optimization control node 50) to correlate the requests, and their timing, with multimedia content requests from other users, and to aggregate the users into groups (block 202). In response to a set of other users in a group requesting multimedia content within a predetermined temporal duration, the terminal equipment 20 autonomously receives the same multimedia content over a broadcast channel (block 204). The terminal equipment 20 may be commanded to buffer the multimedia content, and receive an identification of the broadcast channel on which to receive the multimedia content, via control signaling from a "swarm" optimization control node 50. The terminal equipment 20 buffers the multimedia content received via the broadcast channel (block 206).

If no user of the terminal equipment 20 requests the multimedia content (block 208) within a predetermined time frame, it is deleted from the buffer (block 209), and the user is generally not even aware that it was received and buffered. On the other hand, if a user does request the same multimedia content (block 208), the terminal equipment 20 submits a request for the content to the distribution network 12 (block 210), as conventionally known. The terminal equipment 20 then receives at least an initial portion of the multimedia content from the distribution network, via an individual distribution channel, such as an IPTV unicast stream (block 212). The terminal equipment 20 renders this content for viewing by users (block 214).

When the multimedia content rendered by the terminal equipment 20 reaches the point at which the same content is stored in a buffer (block 216)—that is, at or beyond the "broadcast commencement point" defined above—then the terminal equipment 20 "switches over" from rendering the content from the individual distribution channel to rendering the buffered content received via the broadcast channel (block 218). U.S. Pat. No. 5,682,597 discloses one system and method operative to seamlessly switch the rendering of video content from different sources "on the fly."

At this point, the multimedia content distribution network 12 may terminate the individual distribution of the multimedia content, and release the network resources allocated to it. In a typical case, a large number of terminal equipment 20 will have buffered the multimedia content from a single broadcast channel. The individual distribution channels required for the distribution of the initial portion of the content to each user—that is, until the rendering at each terminal equipment 20 "catches up" to the "broadcast commencement point" of the buffered content—are required for only a very short time. In this manner, the impact of the "swarm" on the multimedia content distribution network 12 is dramatically reduced, relative to the prior art method of delivering the entire duration of multimedia content to each requesting user in a dedicated, individual distribution channel.

Figure 5:
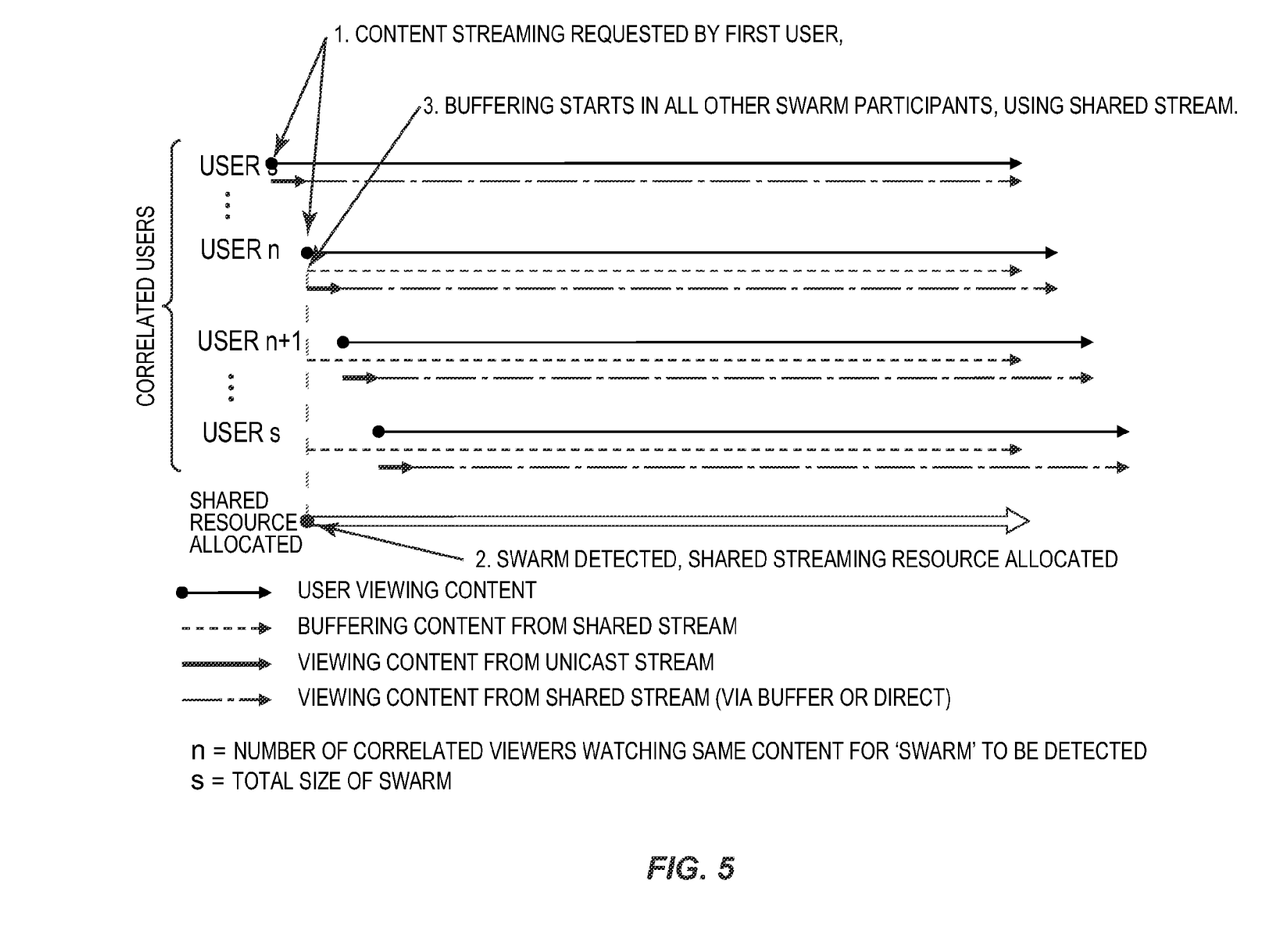
FIG. 5 is a timing diagram depicting "swarming" behavior, and the efficient distribution of multimedia content according to embodiments of the present invention.

FIG. 5 depicts this feature of embodiments of the present invention in a timing diagram depicting the multimedia content distribution to, and rendering at, each terminal equipment 20 within a predefined group that requests the same multimedia content. Initially, User 1 requests a particular multimedia content (point 1), and the multimedia content distribution network 12 respondents by delivering the requested content on a dedicated, individual distribution channel, as indicated by the short, bold line. Other users (not pictured) rapidly follow, requesting the same multimedia content. By the time User n requests the same multimedia content (point 2), the multimedia content distribution network 12 (in particular, the "swarm" optimization control node 50) detects the onset of a "swarm." That is, in this example, the set of initially-requesting users in the relevant group is of size n.

At this point (point 2), the multimedia content distribution network 12 begins broadcasting the requested multimedia content on a shared channel, as indicated by the outlined line at the bottom of FIG. 5. The terminal equipment 20 of User 1, in this example, switches over from rendering the content from an individual distribution channel to rendering the content directly from the broadcast channel, as indicated by the dashed-and-dotted line. The network 12 directs terminal equipment 20 associated with all other users in the group to buffer the multimedia content from the broadcast channel (point 3), as indicated by the dotted lines.

Since the broadcast of the multimedia content begins at the "broadcast commencement point" defined above, and not at the beginning of the content, the initial portion of the requested multimedia content must be delivered to each terminal equipment 20 in a dedicated, individual broadcast channel, as indicated by the short, bold lines. As each terminal equipment 20 (i.e., User n, User n+1, and User s, as depicted in FIG. 5) renders the multimedia content received via its respective individual distribution channel, and reaches the "broadcast commencement point," it "switches over" and renders the buffered multimedia content received via the broadcast channel, as indicated by the much longer dashed-and-dotted lines.

As these "switch over" points are reached, and terminal equipment 20 switches from their respective unicast streams to their buffered content, the unicast streams are "torn down" by the multimedia content distribution network 12, as known in the art, and the network resources made generally available. Similarly, in one embodiment, when the requested multimedia content distribution via the broadcast channel is complete, the broadcast channel, or multicast stream, is "torn down" by the multimedia content distribution network 12, as known in the art.

In one embodiment, when a threshold number of users of another group additionally request the same multimedia content, the terminal equipment 20 included in the broadcast distribution may be increased to include the second group. If sufficient time has elapsed since the beginning of the distribution of the multimedia content to the initial group, terminal equipment 20 of users in the second (or third, etc.) group may buffer only the latter portions of the multimedia content. In this case, the broadcast distribution may continue, "looping" to the beginning of the multimedia content, and continuing its distribution. In some cases—such as for large, slowly-developing "swarms," the broadcast channel may continue in operation for an extended duration. Furthermore, in some such cases, the terminal equipment 20 of a later-requesting user may be able to render the entire multimedia content from its buffer, avoiding the need for even the short, initial unicast stream from the multimedia content distribution network 12.

When the number of terminal equipment 20 to which multimedia content is being distributed via a broadcast channel decreases to a threshold value, the multimedia content distribution network 12 may switch the distribution from a broadcast channel to individual unicast streams. Alternatively, the broadcast distribution may continue to the end of the current replaying of the multimedia content, and then terminate, with later-requesting users being served the multimedia content in unicast streams, unless or until the number of requesting users again increased beyond a threshold and another broadcast channel is set up.

FIG. 5 dramatically demonstrates the increased efficiency of "swarm" multimedia content distribution according to embodiments of the present invention, by juxtaposition of the very short bold lines indicating the duration of rendering content received via an individual distribution channel, and the much longer dashed-and-dotted lines indicating the duration of rendering buffered content received via a single broadcast channel.

FIG. 1 depicts some of the relevant signaling within the multimedia content distribution network 12, according to embodiments of the present invention. The "swarm" optimization control node 50 receives stream setup requests—that is, requests for the delivery of multimedia content—from terminal equipment 20, and sends both streaming and buffering control commands/requests to the terminal equipment 20. The control node sets 50 up unicast streams—that is, individual distribution channels—of multimedia content from the multimedia content server cluster 14. The control node 50 also sets up shared streams—that is, broadcast channels—of multimedia content from the headend 16. The broadcast channels may, for example, comprise IGMP groups or QAM channels of Streaming Digital Video (SDV). The multimedia content server cluster 14 transmits multimedia content to the headend 16 for distribution in a shared stream. The headend 16 sends both unicast streams, e.g., Real Time Streaming Protocol (RTSP) or HyperText Transfer Protocol (HTTP) streaming, and multicast streams (RTSP or IGMP) to. e.g., the edge QAM 18 and/or the media gateway 32. The edge QAM 18, GW 32, and/or other distribution equipment, distributes multimedia content, in both individual distribution and broadcast channels, to terminal equipment 20, including wireless User Equipment 38.

Figure 6:
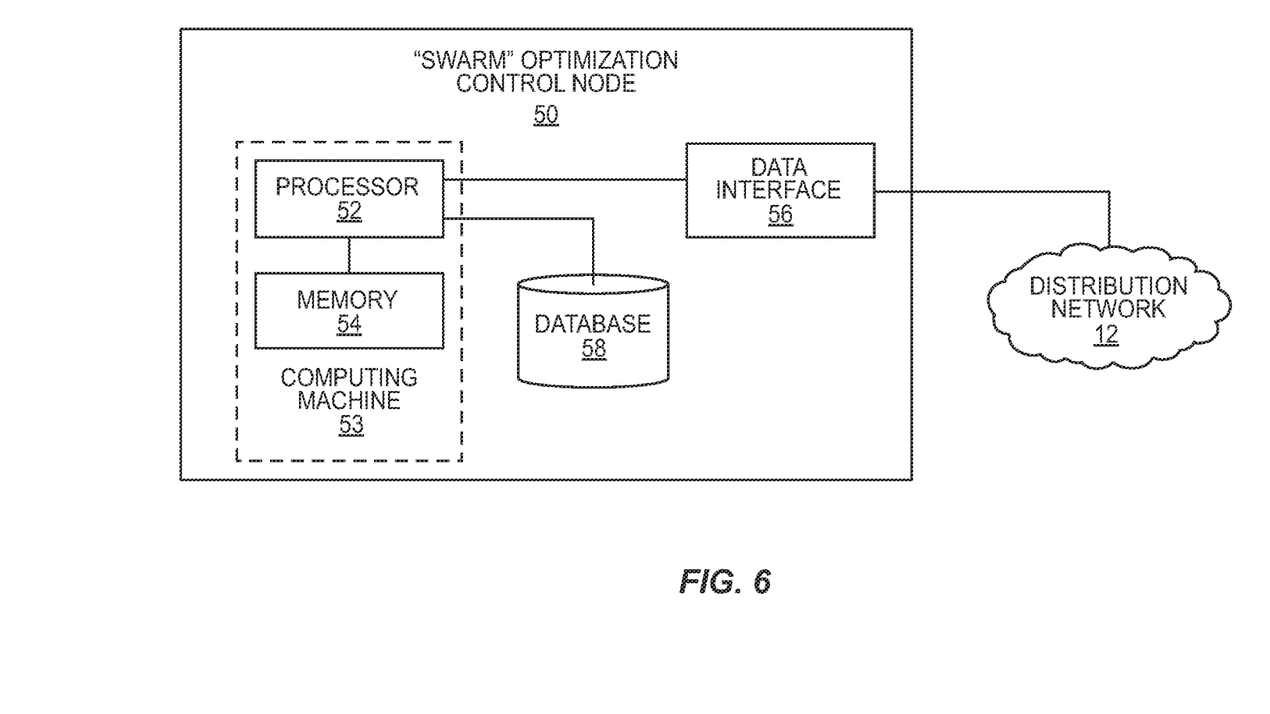
FIG. 6 is a functional block diagram of a "swarm" optimization control node operative in the multimedia content distribution network of FIG. 1.

FIG. 6 depicts a representative "swarm" optimization control node 50. The control node 50 includes a processor 52, operatively connected to memory 54 and a data base 58. The processor 52 is also connected to at least one data interface 56, operative to format messages to and from the multimedia content distribution network 12.

The processor 52, together with the memory 54, comprises a computing machine 53 operative to perform the steps of the method 100 described herein. The processor 52 may comprise a hardware state machine; a programmable logic array with appropriate firmware; a microprocessor or digital signal processor (DSP) with appropriate software; or any combination thereof. The memory 54 may comprise solid state memory (e.g., ROM, DRAM, Flash, and the like), and/or a device capable of reading computer-readable media, such as optical or magnetic media. The database 58 may comprise any structure or circuit operative to store and retrieve data. In particular, the database 58 is operative to store and retrieve records of multimedia content requests by users, the times of those requests, correlations between users, membership lists defining groups of users based on the correlations, and the like. In some embodiments, the database 64 may reside in the multimedia content distribution network 12, outside of the "swarm" optimization control node 50.

The data interface 56 may comprise physical circuits, or alternatively may comprise one or more functional software modules executed by the processor 52. In general, the data interface 56 may comprise any interface operative to reliably exchange data with the multimedia content distribution network 12 according to a defined protocol. The data interface 56 may implement a number of layers, or protocol stacks, of a communication protocol, and perform functions such as data encapsulation, packet assembly, error correction, encryption, and the like, as well known in the communication arts.

Figure 7:
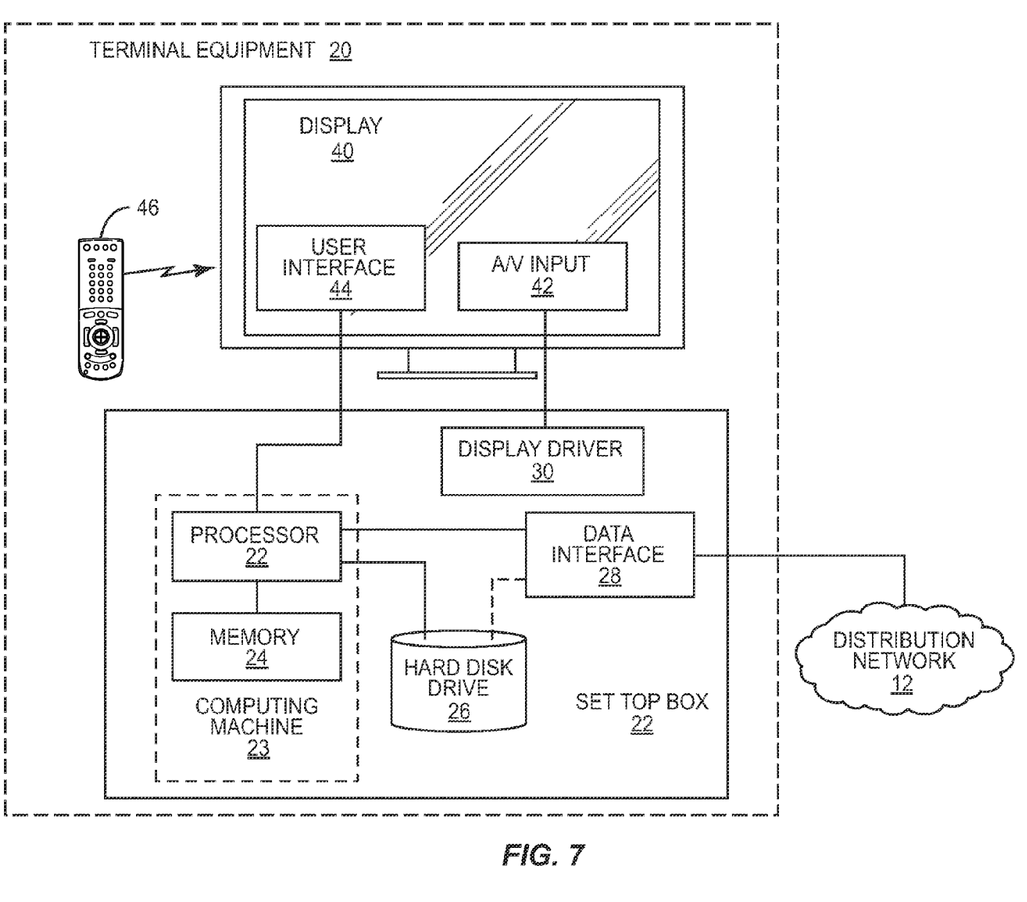
FIG. 7 is a functional block diagram of terminal equipment operative in the multimedia content distribution environment of FIG. 1.

FIG. 7 depicts a representative fixed terminal equipment 20. The terminal equipment 20 includes a display 40, such as a television screen, operative to render multimedia content to users, and control or interface equipment 22, such as a set top box (STB) operative to communicate with the multimedia content distribution network 12. The STB 22 includes a processor 22, operatively connected to memory 24 and a mass storage unit 26, such as read/write optical or magnetic media drive. The processor 22 is also connected to at least one data interface 28, operative to format messages to and from, and receive multimedia content from, the multimedia content distribution network 12.

The processor 22, together with the memory 24, comprises a computing machine 23 operative to perform the steps of the method 200 described herein. The processor 22 may comprise a hardware state machine; a programmable logic array with appropriate firmware; a microprocessor or digital signal processor (DSP) with appropriate software; or any combination thereof. The memory 24 may comprise solid state memory (e.g., ROM, DRAM, Flash, and the like), and/or a device capable of reading computer-readable media, such as optical or magnetic media. The mass storage unit 26 may comprise any structure or circuit operative to store and retrieve data representing multimedia content. In particular, the mass storage unit 26 is operative to autonomously buffer, and retrieve on demand, multimedia content delivered via a broadcast channel by the multimedia content distribution network 12. In some embodiments, the mass storage unit 26 may reside external to the STB 22.

In some embodiments, the STB 22 additionally includes a display driver 30 operative to format multimedia content in a form recognized by the display 40, such as HDMI, component, or composite (e.g., NTSC or PAL) analog video signal, Dolby Digital or MP3 audio signal, JPEG image format, or the like. In other embodiments, the display driver 30 may reside in the display 40, which receives multimedia content directly from the multimedia content distribution network 12 or HDD 26.

The data interface 28 may comprise physical circuits, or alternatively may comprise one or more functional software modules executed by the processor 22. In general, the data interface 28 may comprise any interface operative to reliably exchange messages with, and receive multimedia content from, the multimedia content distribution network 12 according to a defined protocol. The data interface 28 may implement a number of layers, or protocol stacks, of a communication protocol, and perform functions such as data encapsulation, packet assembly, error correction, encryption, and the like, as well known in the communication arts.

The display 40 may comprise any equipment operative to render multimedia content to users, such as a TV screen, audio player, or the like. The display 40 includes one or more audio/visual inputs 42 operative to receive multimedia rendering signals from the display driver 30. The display 40 additionally includes a user interface 44 operative to display options to, and accept selections from, users, such as via a remote control 46. In some embodiments, the user interface 44 may comprise one or more functional software modules executed by the processor 22, or one or more processors (not shown) in the display 40.

The details of terminal equipment 20 in the form of wireless User Equipment 38 are not explicitly depicted in FIG. 7. However, such equipment is well known in the art, and in general includes the same functionality as that described above with respect to fixed terminal equipment 20.

Embodiments of the present invention present numerous advantages over multimedia content distribution networks according to the prior art, in the face of user "swarming" behavior. In particular, by predicting swarming behavior, and preemptively buffering likely requested content to the users most likely to request it, the allocation of numerous, redundant individual content distribution channels is limited to the very short duration required for each user to "catch up" with the buffered content. The bulk of the requested multimedia content is delivered to most users via a single broadcast channel, even when the user requests are not perfectly time-synchronized. These advantages are particularly acute for service providers offering "viral content" that is most subject to user swarming behavior, such as news articles, video clips, non-real-time TV programs, and the like. The swarm prediction is autonomous, and improves with time. Accordingly, the network swarming performance optimization realized by embodiments of the present invention improves over time and with greater use.

The above discussion and the drawing figures depict only particular, representative embodiments of the present invention, and are not limiting. As those of skill in the art will readily appreciate, given the teachings herein, numerous variations are possible within the broad scope of the present invention. For example, the "broadcast commencement point" within the requested multimedia content may be set to the very beginning of the content, to a point matching the current rendering (or viewing) point of one or more users, to a point ahead of the aggregate current rendering point of a plurality of users, or in general, at any point in the multimedia content. As another example, the functionality of the "swarm" optimization control node 50 may, in various embodiments, be distributed in two or more physical nodes in the multimedia content distribution network 12. For example, the ongoing monitoring of user viewing habits, correlation analysis, and group formation functions may be performed in an application server, and the multimedia content distribution and terminal equipment 20 control may be performed in a separate application server, with appropriate signaling between the two.

As used herein, multimedia content refers to information, such as digital information, operative to be rendered into human-perceivable graphic, video, and/or audio form by appropriate terminal equipment 20. Examples include audio (e.g., music, songs, podcasts, and the like), video (e.g., movies, video clips, animated graphics, and the like), and graphics (e.g., images, photographs, graphic art, and the like, and collections thereof). The term is meant to be construed broadly. Accordingly, as used herein, terminal equipment 20 refers to equipment operative to render multimedia content in a form perceptible by users, as well as the control equipment operative to communicate with and receive multimedia content from the multimedia content distribution network 12, and further operative to autonomously buffer multimedia content as described herein. As nonlimiting examples, the rendering equipment may comprise an image and/or video display, and/or audio reproduction equipment (e.g., audio amplifier and speakers). As used herein, a "swarm" refers to a plurality of requests, by different users, for the same multimedia content, the requests transmitted to the multimedia content distribution network 12 with a predetermined temporal duration. As used herein, the terms user and subscriber are synonymous, in that users are assumed to be subscribers of a multimedia content distribution service implementing embodiments of the present invention (or users of terminal equipment 20 associated with at least one subscriber).

The methods 100 and 200 of embodiments of the present invention may be implemented as software modules operative to cause one or more appropriately-configured computing machines 53, 23 to perform the defined method steps. Such software may be stored as program code on nontransient computer-readable media, such as optical media (e.g., CD-ROM, DVD), magnetic media (e.g., hard disc drive or floppy disc), solid state memory (e.g., ROM, PROM, Flash memory), or the like, as known in the art. In some embodiments, the software may be transmitted as transient signals via a data communication network, such as the Internet. In any case, the software is operative to transform an appropriately-configured computing machine 53, 23, to a novel, nonobvious, inventive machine operative to perform at least the methods 100 and 200.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Various method steps and system elements can be combined with each other in a variety of different ways to achieve the same or a similar result without departing from the scope of the present invention.

What is claimed is:

1. A method of optimizing the distribution of multimedia content to a plurality of users within a predetermined temporal duration, by a computing machine in a network node, the method comprising:
    monitoring the multimedia content requests of a plurality of users; correlating users based on the multimedia content requested by the users and the times at which the multimedia content is requested by the users;
    forming one or more groups of users based on the correlations among the users; receiving requests for first multimedia content from a set of users in a first one of the one or more groups, the requests received within a predetermined temporal duration;
    in response to the reception, predicting requests for the first multimedia content from other users in the first one of the one or more groups;
    in response to the prediction, allocating a broadcast channel for the broadcast of the first multimedia content to users in the first one of the one or more groups;
    controlling terminal equipments associated with users in the first one of the one or more groups to receive and buffer the first multimedia content;
        broadcasting the first multimedia content on the allocated broadcast channel to users in the first one of the one or more groups;
    receiving a request for the first multimedia content from a second user in the first one of the one or more groups not in the set of users;
    individually distributing at least an initial portion of the first multimedia content to the second user; and
    terminating the individual distribution of the first multimedia content to the second user after the terminal equipment associated with the second user begins rendering the first multimedia content from the buffered first multimedia content.

2. The method of claim 1 wherein correlating users based on the multimedia content requested by the users and the times at which the multimedia content is requested by the users comprises correlating users requesting the same multimedia content within a predetermined temporal duration.

3. The method of claim 1 wherein correlating users based on the multimedia content requested by the users and the times at which the multimedia content is requested by the users further comprises adjusting existing correlations based on the coincidences of multimedia content requests and their times among users.

4. The method of claim 1 wherein correlating users based on the multimedia content requested by the users and the times at which the multimedia content is requested by the users further comprises updating all existing correlations with one user, whenever that user requests multimedia content.

5. The method of claim 1 wherein forming one or more groups of users based on the correlations among the users comprises updating existing groups based on changes to correlations among users.

6. The method of claim 1 wherein broadcasting the first multimedia content on the allocated broadcast channel to users in the first one of the one or more groups comprises broadcasting the first multimedia content on at least one of a dedicated cable Quadrature Amplitude Modulated (QAM) channel, a dedicated, transient Internet Group Management Protocol (IGMP) group for Internet Protocol (IP) streams, and a broadcast channel of a wireless communication network to a plurality of wireless terminal equipments operatively associated with the network.

7. The method of claim 1 wherein broadcasting the first multimedia content on the allocated broadcast channel to users in the first one of the one or more groups comprises broadcasting the first multimedia content beginning at an offset into the first multimedia content ahead of an aggregate viewing point of the first multimedia content among the set of users of the first one of the one or more groups receiving the first multimedia content.

8. The method of claim 1 further comprising: monitoring the number of users requesting the first multimedia content;
    at the termination of broadcasting the first multimedia content on the allocated broadcast channel to users in the first one of the one or more groups, if a predetermined number of users in the first one of the one or more groups requested the first multimedia content within a predetermined duration of the end of the first multimedia content broadcast, broadcasting the first multimedia content on the allocated broadcast channel to users in the first one of the one or more groups again.

9. The method of claim 1 further comprising: monitoring the number of users requesting the first multimedia content;
    at the termination of broadcasting the first multimedia content on the allocated broadcast channel to users in the first one of the one or more groups, if less than a predetermined number of users in the first one of the one or more groups requested the first multimedia content within a predetermined duration of the end of the first multimedia content broadcast, individually distributing the first multimedia content on dedicated channels to selected users in the first one of the one or more groups.

10. A node in a multimedia content distribution network, comprising:
    a data interface to the network;
    a database operative to store a plurality of multimedia content; and a computing machine operative to:
    monitor multimedia content requests received over the network, via the data interface, from a plurality of users;
    correlate users based on the multimedia content requested by the users and the times at which the multimedia content is requested by the users;
    form one or more groups of users based on the correlations among the users;
    receive a request, via the data interface, for first multimedia content from a set of user in a first one of the one or more groups;
    in response to the reception, predict requests for the first multimedia content, within a predetermined temporal duration, from other users in the first one of the one or more groups;

in response to the prediction, allocate a broadcast channel for the broadcast of the first multimedia content to users in the first one of the one or more groups;

retrieve the first multimedia content from the database;

control terminal equipments associated with users in the first one of the one or more groups to receive and buffer the first multimedia content;

broadcast the first multimedia content over the network, via the data interface, on the broadcast channel, to users in the first one of the one or more groups;

receive a request, via the data interface, for the first multimedia content from a second user in the first one of the one or more groups not in the set of users;

individually distribute, via the data interface, at least an initial portion of the first multimedia content to the second user; and terminate the individual distribution of the first multimedia content to the second user after the terminal equipment associated with the second user begins rendering the first multimedia content from the buffered first multimedia content.

11. The node of claim 10 wherein the computing machine is operative to correlate users based on the multimedia content requested by the users and the times at which the multimedia content is requested by the users by performing at least one of a correlation of users requesting the same multimedia content within a predetermined temporal duration, an adjustment of exiting correlations based on the coincidences of multimedia content requests and their times among users, and an update of all existing correlations with one user, whenever that user requests multimedia content.

12. The node of claim 10 wherein the computing machine is operative to form one or more groups of users based on the correlations among the users by updating existing groups based on changes to correlations among users.

13. The node of claim 10 wherein the computing machine is operative to broadcast the first multimedia content on the broadcast channel to users in the first one of the one or more groups by broadcasting the first multimedia content on a dedicated cable Quadrature Amplitude Modulated (QAM) channel.

14. The node of claim 10 wherein the computing machine is operative to broadcast the first multimedia content on the broadcast channel to users in the first one of the one or more groups by broadcasting the first multimedia content in a dedicated, transient Internet Group Management Protocol (IGMP) group for Internet Protocol (IP) streams.

15. The node of claim 10 wherein the computing machine is operative to broadcast the first multimedia content on the broadcast channel to users in the first one of the one or more groups by broadcasting the first multimedia content via a broadcast channel of a wireless communication network to a plurality of terminal equipments operatively associated with the wireless network.

16. The node of claim 10 wherein the computing machine is operative to broadcast the first multimedia content on the broadcast channel to users in the first one of the one or more groups by broadcasting the first multimedia content beginning at an offset into the first multimedia content ahead of an aggregate viewing point of the first multimedia content among users of the first one of the one or more groups receiving the first multimedia content.

17. A method of rendering multimedia content by a computing machine in a terminal equipment connected to a distribution network, comprising:

submitting multimedia content requests to the distribution network over time, such that users of different terminal equipments may be aggregated into one or more groups of users based on correlations of multimedia content requested by the users and the time at which the multimedia content requested is requested by the users;

autonomously receiving, in response to another set of users in a first of the one or more groups requesting first multimedia content, at least part of the first multimedia content over a broadcast channel;

buffering the first multimedia content received over the broadcast channel; in response to user input, submitting a request for the first multimedia content to the distribution network;

receiving an initial portion of the first multimedia content, the initial portion not previously received over the broadcast channel, from the distribution network over a dedicated channel;

rendering the initial portion of the first multimedia content received from the distribution network over the dedicated channel; and when the rendering of the first multimedia content received from the distribution network over the dedicated channel reaches a beginning of the buffered first multimedia content, switching to rendering the buffered first multimedia content.

18. The method of claim 17 wherein the broadcast channel comprises at least one of a dedicated cable Quadrature Amplitude Modulated (QAM) channel, a dedicated, transient Internet Group Management Protocol (IGMP) group for Internet Protocol (IP) streams, and a broadcast channel of a wireless communication network operative to simultaneously transmit multimedia content to a plurality of associated terminal equipments.

19. A terminal equipment configured to be connected to a distribution network operative to selectively render multimedia content to a user, comprising:

a data interface to the network;

a user interface operative to receive user requests for multimedia content; a display operative to render multimedia content to the user;

memory operative to buffer multimedia content; and a computing machine operative to:

submit multimedia content requests to the distribution network over time, via the data interface, such that users of different terminal equipments may be aggregated into one or more groups of users based on correlations of multimedia content requested by the users and the time at which the multimedia content is requested by the users;

autonomously receive from the network via the data interface, in response to another set of users in a first one of the one or more groups requesting first multimedia content, at least part of the first multimedia content over a broadcast channel;

buffer in memory the first multimedia content received via the data interface over the broadcast channel;

in response to user input at the user interface, submit a request for the first multimedia content to the distribution network via the data interface;

receive from the distribution network, via the data interface, an initial portion of the first multimedia content, the initial portion not previously received over the broadcast channel, over a dedicated channel;

rendering the initial portion of the first multimedia content received from the distribution network over the dedicated channel via the display; and when the rendering of the first multimedia content received from the distribution network over the dedicated channel reaches a beginning of the buffered first multimedia content, switching to rendering the buffered first multimedia content via the display.

20. The terminal equipment of claim 19 wherein the broadcast channel comprises at least one of a dedicated cable Quadrature Amplitude Modulated (QAM) channel, a dedicated, transient Internet Group Management Protocol (IGMP) group for Internet Protocol (IP) streams, and a broadcast cha of a wireless communication network.

* * * * *